(No Model.) 2 Sheets—Sheet 1.
G. M. WILLIAMS.
CORN PLANTER.
No. 312,594. Patented Feb. 17, 1885.
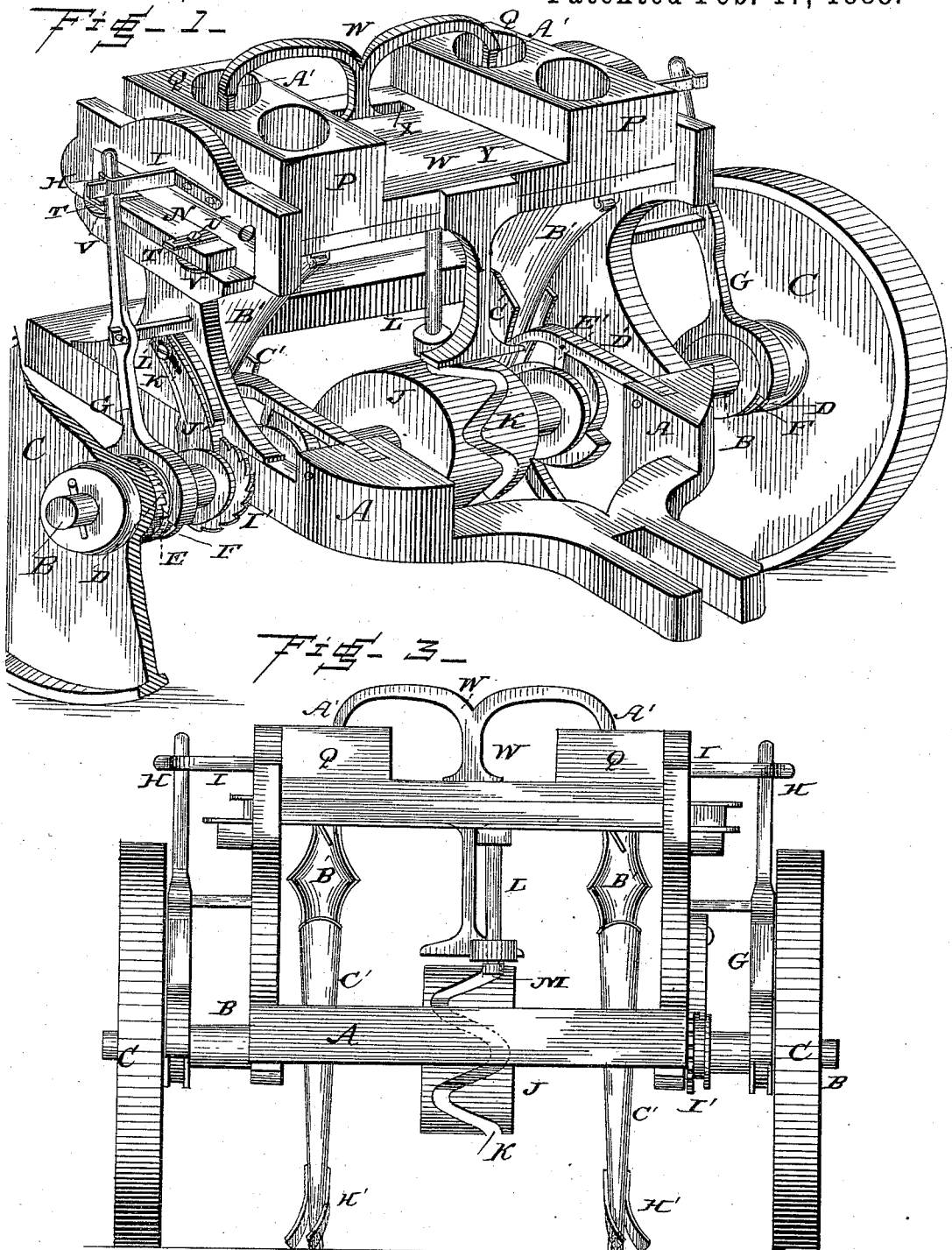
WITNESSES:
INVENTOR.
George M. Williams
by Louis Bagger & Co.
ATTORNEYS.

(No Model.) 2 Sheets—Sheet 2.
G. M. WILLIAMS.
CORN PLANTER.
No. 312,594. Patented Feb. 17, 1885.
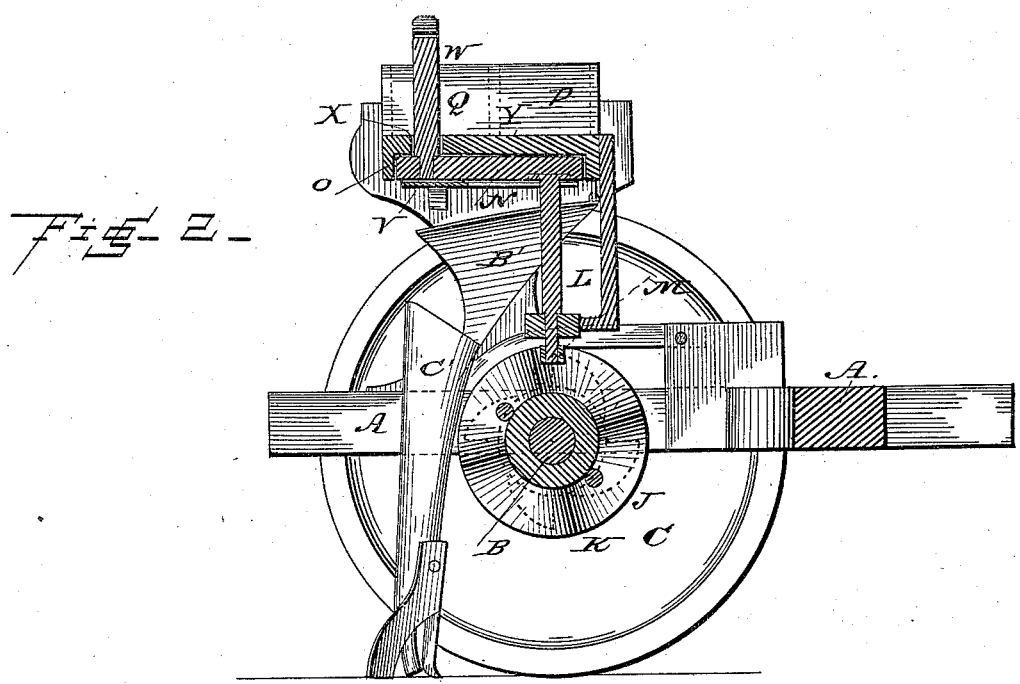
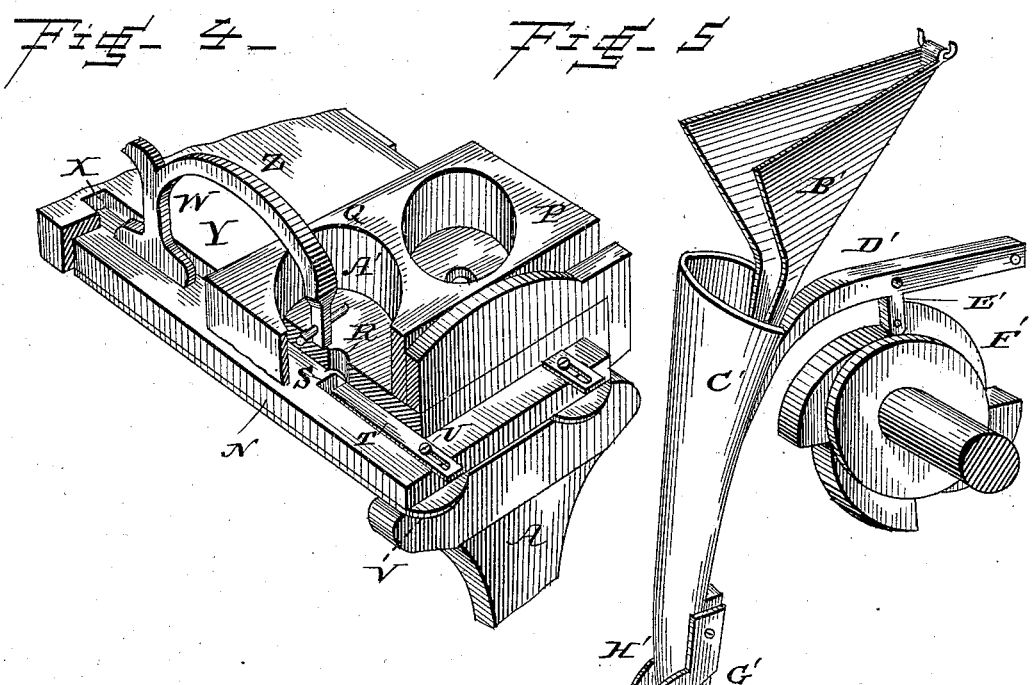
WITNESSES:
INVENTOR.
Geo. M. Williams
by Louis Bagger & Co.
ATTORNEYS.

UNITED STATES PATENT OFFICE.

GEORGE MARSEL WILLIAMS, OF NEWARK, DELAWARE.

CORN-PLANTER.

SPECIFICATION forming part of Letters Patent No. 312,594, dated February 17, 1885.

Application filed May 26, 1884. (No model.)

*To all whom it may concern:*

Be it known that I, GEORGE M. WILLIAMS, a citizen of the United States, and a resident of Newark, in the county of New Castle and State of Delaware, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved corn-planter. Fig. 2 is a longitudinal vertical section of the same. Fig. 3 is a rear view. Fig. 4 is a perspective detail view of the seed and fertilizer boxes, showing portions broken away; and Fig. 5 is a similar view of one of the seed-tubes and its operating mechanism.

Similar letters of reference indicate corresponding parts in all the figures.

My invention has relation to corn-planters having mechanism for dropping fertilizing material with the corn; and it consists in the improved construction and combination of parts of the same, as hereinafter more fully described and claimed.

In the accompanying drawings, the letter A indicates the frame of the planter, which forms bearings for the axle B, upon the ends of which the wheels C C turn, and the inner ends of the hubs of the wheels are provided with ratchet-disks D, forming half-clutches adapted to be engaged by bevel clutch-teeth E, upon two grooved sleeves, F, sliding upon and turning with the axle, into the grooves of which sleeves the bifurcated ends of two levers, G G, pivoted to rock vertically at the sides of the frame, engage, which levers may be held at their upper ends by projections H, upon two laterally-projecting arms, I, upon the sides of the frame in such a manner that the lower ends of the levers may either hold the sleeves and their teeth to engage the clutches upon the hubs or hold them disengaged from the clutches, each lever and sleeve working independently of the other. The middle of the axle is provided with a wheel or disk, J, having a zigzag or waved groove, K, in its periphery, and the lower end of an arm, L, provided with an anti-friction roller, M, travels in this groove, the arm projecting vertically from the under side of the seed and fertilizer slide N, which slides move transversely in ways O in the upper portion of the frame and under the seed-boxes P and fertilizer-boxes Q, the latter being preferably placed to the rear of the seed-boxes.

The seed and fertilizer boxes have apertures R in their bottoms, and the slide has perforations or cups S, which may register with the said apertures, and which may be adjusted in size by means of slotted plates T, sliding with their slots upon set-screws U, and projecting with their inner ends over the cups, thus covering a larger or smaller portion of the cups, according to their adjustment. Perforated plates V are secured under the slide, having their perforations registering with the perforations or cups of the slide at one end of the stroke of the slide, while the slide-cups register with the apertures in the bottoms of the boxes at the other end of the stroke, and the slide has an upright arm, W, sliding in a transverse slot, X, in the portion Y of the frame connecting the seed and fertilizer boxes, which arm has a cross-head, Z, from the ends of which two pending arms, A', project, which project into the fertilizer-boxes and serve to stir the fertilizing material and feed it to the apertures in the boxes when the slide is reciprocated. Two funnels, B', are hinged at their forward sides to the forward edge of the top portion, Y, of the frame, and cover with their mouths the perforations in the plates under the slide, and two seed-tubes, C' C', fit with their upper ends over the lower contracted ends of the funnels, and have their forward sides formed by curved arms or bars D', hinged at their forward ends to the forward portion of the planter-frame and provided upon the under sides of their horizontal portions with a downwardly-projecting lug, E'. These lugs bear against the peripheries of two cam-disks, F', upon the axle, fitting between the projections upon the same, and being raised by the said projections as the axle and the disks revolve, and (the length of the projections upon the disks depends upon the distance desired to be left between each hill planted) the descending seed-tubes dropping the seed in a hill while the ends of the seed-tubes travel above the ground when the lugs are raised by the projections. Two openers or narrow shovels, G', are hinged to the lower ends of the curved arms or bars, and have at their sides each two wings, H', which are bent or curved toward the sides of the planter, throwing the dirt slightly to the side at each hill, covering the seed after it is dropped, and forming a slight elevation at each hill. A ratchet-wheel, I', is secured at one end of the axle outside the bearing of the frame, and a pawl, J', having a longitudinal slot, K', is pivoted upon a setscrew, L', upon which the pawl slides and swings upon the side of the frame, and this pawl-and-ratchet wheel will prevent the axle from being reversed when the wheels are connected to the axle by the clutches, which might result in the breaking of the seed-dropping mechanism.

Having thus described my invention, I claim and desire to secure by Letters Patent of the United States—

1. The combination of the slide, the fertilizer-boxes, and the upright arm upon the slide having the cross-head and the pending arms projecting into the fertilizer-boxes, as and for the purpose shown and set forth.

2. The combination of the seed and fertilizer boxes, the funnels hinged at their forward sides under the apertures of the said boxes, the curved arms having the downwardly-projecting lugs, the seed-tubes having the shovels and the curved covering-wings, and the cam-disks secured upon the axle and engaging the lugs upon the arms, as and for the purpose shown and set forth.

3. The combination of the curved arms and seed-tubes, the openers or shovels hinged to the lower ends of the curved arms, and the laterally-curved covering-wings secured to the sides of the hinged shovels curved toward the outer sides of the planter, as and for the purpose shown and set forth.

4. The combination of the axle having the zigzag-grooved disk, the wheels having half-clutches upon their hubs, the sleeves having half-clutches and having means for operating them independently, the cam-disks secured upon the axle, the seed-slide having adjustable seed and fertilizer cups having the downwardly-projecting arm engaging the zigzag groove and having the upwardly-projecting arm provided with the cross-head and the fertilizer-stirrers, the seed and fertilizer boxes, the funnels hinged under the apertures of the said boxes, and the curved arms having the downwardly-projecting cam-engaging lugs, the seed-tubes and shovels and coverers, as and for the purpose shown and set forth.

In testimony that I claim the foregoing as my own I have hereunto affixed my signature in presence of two witnesses.

GEORGE MARSEL WILLIAMS.

Witnesses:
 WM. McKEOWAN,
 J. W. FRANCE.